Figure 1:
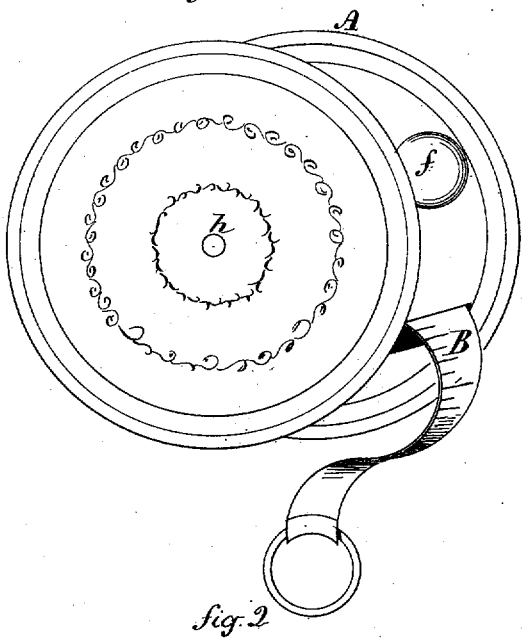
Figure 2:
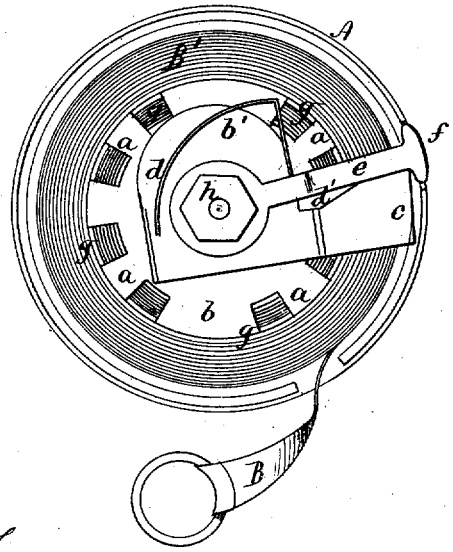

A. J. FELLOWS.

Improvement in Tape-Measures.

No. 5,009. Reissued July 30, 1872.

Witnesses.
J. H. Shumway
W. A. Bull

Alvin J. Fellows
Inventor
By Atty.
John S. Earle

AM. PHOTO-LITHOGRAPHIC CO. N.Y. (OSBORNE'S PROCESS.)

UNITED STATES PATENT OFFICE.

ALVIN J. FELLOWS, OF NEW HAVEN, ASSIGNOR TO NATHANIEL L. BRADLEY AND WALTER HUBBARD, OF MERIDEN, CONNECTICUT.

IMPROVEMENT IN CASES FOR TAPE-MEASURES.

Specification forming part of Letters Patent No. 79,965, dated July 14, 1868; reissue No. 5,009, dated July 30, 1872.

DIVISION B.

*To all whom it may concern:*

Be it known that ALVIN J. FELLOWS, of New Haven, in the county of New Haven and State of Connecticut, has invented a new Improvement in Composition Case for Tape-Measures; and we do hereby declare the following to be a full, clear, and exact description of the same.

This invention relates to the construction of a case for tape-measures from a composition of which gum-shellac forms the basis, designed particularly for that class of tape-measures the cases of which have usually been made from metal, and commonly termed pocket tape-measures, or such as contain within the case a spring for winding or drawing in the tape after it has been unwound by hand. The object of this invention is to produce a cheap yet highly-ornamental case; and it consists in forming the case from a compound of gum-shellac and sawdust, or equivalent substance, with suitable coloring matter to produce the desired tint, pressed into molds to give the required shape.

We take gum-shellac as the basis or liquid, with which sawdust or analogous substance is mixed until the required consistency is attained, and mix with this any suitable coloring matter, preferring ivory-black. This prepared gummy substance is placed in molds and hard-pressed, and allowed to dry, or otherwise cured, until it becomes hard, and which, when thoroughly dry, is so very hard that the surface is not liable to wear or the ornamentation to be defaced, and we are enabled to produce a highly-ornamental case and at no more cost than the plain metal heretofore used.

We claim as the invention of the said ALVIN J. FELLOWS—

As an article of manufacture, the case for tape-measures made from the material and in the manner herein specified.

N. L. BRADLEY,
WALTER HUBBARD,
*Assignees of Alvin J. Fellows.*

Witnesses:
L. K. CURTIS,
JOHN Q. THAYER.